3,005,532
DISPENSING AND CONTROLLING MACHINE
Thomas F. Hines, 50 Bonita St., Arcadia, Calif., and Willis L. Wells, Clayton, Mo.; said Wells assignor to said Hines
Filed Sept. 24, 1958, Ser. No. 763,033
10 Claims. (Cl. 194—71)

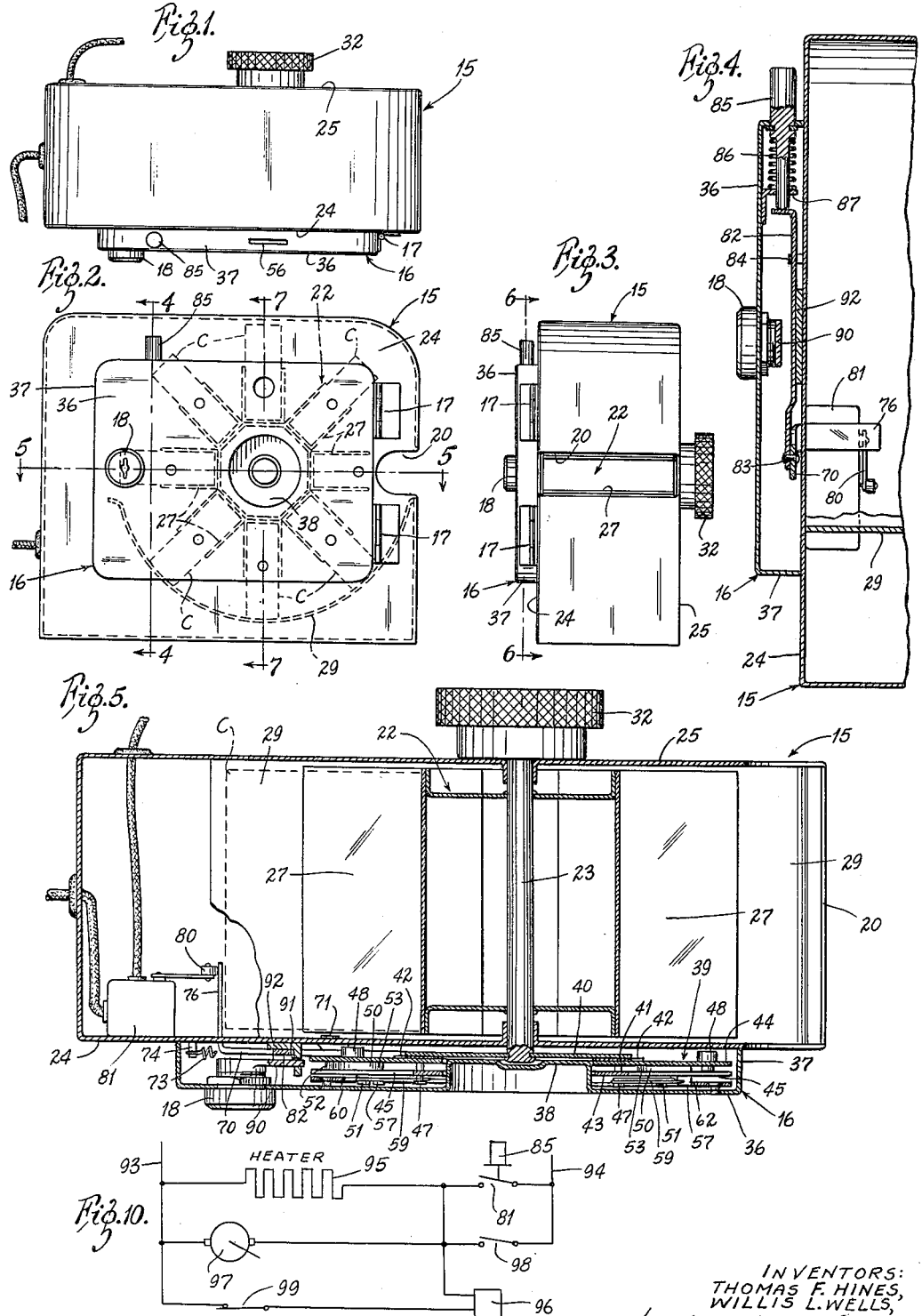

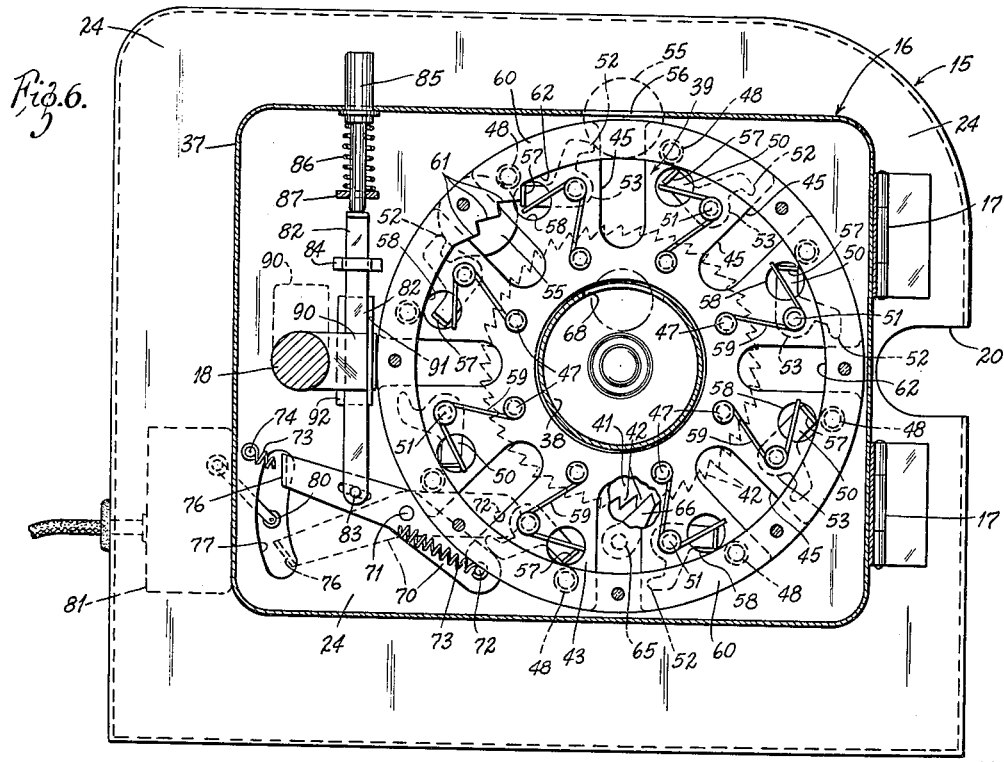
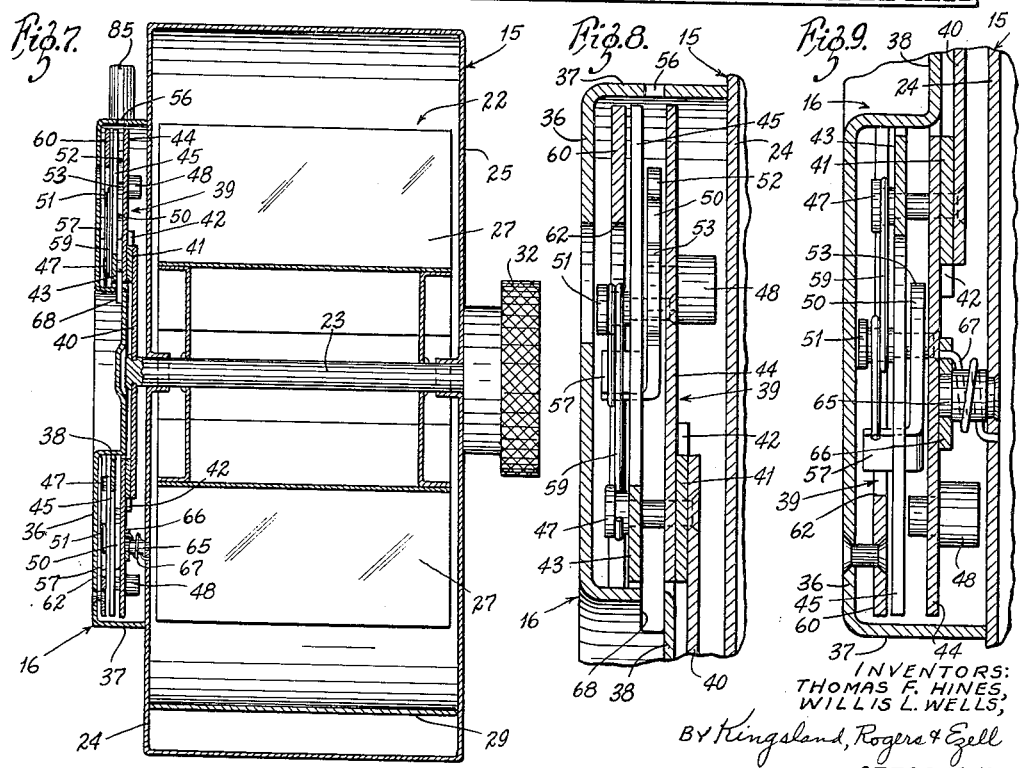
INVENTORS:
THOMAS F. HINES,
WILLIS L. WELLS;
BY Kingsland, Rogers & Ezell
ATTORNEYS

# United States Patent Office 3,005,532
Patented Oct. 24, 1961

The present invention relates to a dispensing and controlling machine. It is particularly adapted for use in making coffee in public places, such as hotel and motel rooms. Essentially, as related to a coffee dispenser, the machine comprises a coin controlled arrangement by which the ingredients for brewing coffee may be dispensed, and in the dispensing operation, mechanism may be cocked, or put in condition, so that, at the will of the operator, an electric heater may be made operative for brewing the coffee at least a given period of time. In other words, the insertion of the coin does not actually start the heater, but merely enables it to be operated for its given cycle of operation at the will of the user. The reason for this is that the user may not be immediately ready to brew the coffee at the moment the ingredients are made available by the dispenser.

Without specifying embodiment of the invention to a coffee machine, it may be said that the machine comprises a dispenser that may be operated by suitable starting or releasing means, to dispense given articles from a supply, with means operated by the functioning of the dispenser to actuate a control for a further processor for processing the ingredients dispensed. The combination, more specifically, involves the cocking of the control rather than the complete operation thereof, so that the further processing may take place at the will of the user; and even more specifically, involves a control for a cooking unit to cook the ingredients.

In general, the machine comprises a rotary magazine having a plurality of receptacles in which individual packages of the articles to be dispensed, such as coffee ingredients, are stored. The magazine is disposed in a housing to one side of which there is attached a control box containing a control mechanism, that is adapted to be operated by coins. When the proper coin is inserted a release is first operated so that the magazine may be moved to bring an article, such as a package of ingredients, to a discharge opening in the casing. During the movement of the parts in the dispensing operation, another control is cocked. Thereupon the cocked mechanism may be operated at the will of the user; and when it is operated it will energize a heater to supply heat to the coffee for a given period of time, or until the coffee reaches a predetermined temperature as is desired.

A preferred embodiment of the invention is illustrated in the accompanying drawings wherein:

FIGURE 1 is a top plan view of a dispensing machine incorporating the principles of the present invention;
FIGURE 2 is a front elevation thereof;
FIGURE 3 is a right end elevation thereof;
FIGURE 4 is a fragmentary vertical section, on an enlarged scale, taken on the line 4—4 of FIGURE 2;
FIGURE 5 is a horizontal section, on an enlarged scale, taken on the line 5—5 of FIGURE 2;
FIGURE 6 is a vertical section, on an enlarged scale, taken on the line 6—6 of FIGURE 3;
FIGURE 7 is a vertical section, on an enlarged scale, taken on the line 7—7 of FIGURE 2;
FIGURE 8 is a reproduction on an enlarged scale of an upper left hand portion of FIGURE 7;
FIGURE 9 is a reproduction on an enlarged scale of a lower left hand portion of FIGURE 7; and
FIGURE 10 is a wiring diagram.

The machine comprises, generally speaking, a main housing 15 to one side of which is attached a control box 16. As shown in the drawings, the control is in the form of a door which is outstanding from the side of the housing 15 and is hinged thereto as at 17. A lock 18 at the opposite side of the door may be released by a key to enable the door to be swung open for servicing.

The housing 15, in a typical embodiment, may be about ten inches wide, eight and one-half inches high and three and three-fourths inches thick, it being understood that these dimensions are not limiting but only illustrative.

The housing has a discharge outlet 20 that is here shown as being midway of one side of the housing. This outlet opening 20 extends across the edge of the machine and around into its front and back sides for reasons to be apparent.

Within the housing 15, there is the magazine 22 in the form of a wheel fixed to a shaft 23 that is given bearing in and projects through both the front panel 24 and the back panel 25 of the housing. The wheel 22 has a plurality of receptacles 27 that open outwardly or radially with respect to the shaft 23. Eight are illustrated, 45° apart. However, one may be eliminated to leave a starting gap. As the magazine rotates, each of these receptacles 27 successively presents its outer open end to the discharge opening 20. Within the housing there is an arcuate plate 29 at least around the lower half of the housing, to prevent the articles in the lower receptacles from falling out.

The shaft 23 projects through the wall 25, and outside the wall it has a handle 32 attached to it, so that when the handle is rotated, the shaft 23 and the wheel 22 are rotated.

From the description thus far, it can be seen that if a package of the ingredients to be dispensed is placed in each of the receptacles 27, then each time the magazine is rotated 45° a new receptacle with its contents may be brought to the opening 20 and withdrawn therefrom by the user.

The shaft also projects through the front wall 24 and into the control box 16. The control box 16 is generally rectangular, with a main front wall 36, surrounded by a flange 37 that spaces the front wall 36 outwardly from the front wall 24 of the main housing. There is a central depression 38 in the front wall 36. It is illustrated as being circular in shape and its function will appear hereafter.

The portion of the shaft 23 that projects into the control box has a rotatively movable control sub-assembly 39 securely attached to its end. This sub-assembly includes a circular plate 40 attached to the shaft 23. The plate 40 supports first an externally toothed ratchet ring 41, the teeth of which are indicated at 42. Additionally, the plate 40 supports a pair of annular discs 43 and 44 held apart a space slightly greater than the thickness of the coins to be used in the machine. The front disc 43 has a series of radial notches 45 that are located at 45° around the disc. These notches are at each coin-receiving station of the sub-assembly 39. Since the sub-assembly 39 is rigid with, moves with, and is in operating effect a part of the magazine, the coin-receiving stations correspond with the stations of the receptacles 27. The discs 43 and 44, the toothed ring 41 and the plate 40 are held rigidly together in the foregoing relationship by a plurality of rivets, some of which are supplied with spacer devices or portions, as will be obvious. There are rivets 47 near the axis that pass through the discs 43, 44, the ring 41 and the plate 40. Outwardly therefrom there are rivets 48 that hold the discs 43 and 44 in properly spaced relationship and also perform an additional function to appear.

Attached to the back disc 44 are a plurality of bell crank shaped dogs 50, one adjacent each station of the sub-assembly 39. They are mounted upon rivet-like pivots 51 that may be either secured to the back disc 44 or secured to both discs, so as to contribute to the rigid connection of the two. Since the coin-receiving elements are the same for each station, only one need be described.

Each bell crank dog 50 has a coin receiving end which comprises a rounded nose 52 and a rounded breast 53. As shown in the drawing, a coin 55 may be introduced through a coin slot 56 at the top of the flange 37 of the control box and forced downwardly between the two discs 43 and 44. The dog 50 is so spaced from the rivet 48 that a coin of proper size forced down through the disc may engage the nose 42 and the rivet 48 so as to move the nose 42 backwardly away from the rivet, producing counterclockwise arcuate movement of the dog 50 about its pivot 51. Upon further insertion of the coin, it will assume a secure three point engagement against the rivet 48, the nose 52 and the breast 53 of the dog 50. Spring action to be described will lock the coin and dog thus, with the dog in its displaced position.

The back end of each bell crank dog 50 has a foot 57 turned forwardly so that it can extend through a hole 58 in the front plate 43. A torsion spring 59 is wrapped around an extension through the front disc 43 of the pivot 51. One end of the spring 59 engages around an extension through the front disc 43 of the rivet 47. The other end of the spring engages the foot 57 on the dog, thereby applying a firm but yieldable force urging the foot 57 of the dog outwardly, and urging the nose 52 of the coin receiving end of the dog into position toward the center of any coin 55 forced through the coin slot 56.

Outside the rotatable coin receiving sub-assembly 39, there is a ring 60 fixed to the control box 16. In one quadrant only this ring has a plurality of ratchet teeth 61 on its inner edge. On either side of the ratchet teeth 61 the ring has a smooth, circular inner edge 62. Unless actuated by a coin, each ratchet dog 50 is rocked inwardly by its springs 59 until its foot 57 rides on the circular portion 62 of the ring 60. When any such ratchet dog 50 is moved to a position adjacent the coin slot 56, its foot 57 will engage the first tooth 61 on the ring 60, thereby prohibiting any further arcuate movement of the control assembly in that direction.

There is an associated ratchet arrangement that prohibits rotation of the control assembly in the opposite direction. As previously noted, there is a toothed ring 41 disposed adjacent the inner portion of the back disc 44 and secured to the plate 40 to rotate with the sub-assembly 39. Secured to the front wall 24 of the main housing 15 is a pivot 65 that rockably supports a ratchet dog 66. This ratchet dog 66 is located at the bottom of the control box, and projects upwardly for engagement with the teeth 41 on the toothed ring 40. It is urged upwardly by a torsion spring 67. As the drawings show, this ratchet dog permits rotation of the control assembly and hence of the shaft 23 and the magazine in one direction (counterclockwise in FIGURE 6), but prohibits in the other direction. It thereby cooperates with the previously mentioned dogs 50 in that it will permit rotation in a feeding direction but will prohibit backward rotation, whereas the ratchet dogs 50 may prevent rotation in a feeding direction unless coins are present.

Opposite the coin slot 56 the recess 38 in the front wall of the control box has a slot 68. Since the size of the slot 56 and the spacing of the rounded breast 53 of each dog 50, from the rivet 48 is exactly enough to permit passage of a coin of chosen size, the machine will reject larger coins, and will permit smaller coins to fall through the slot 68.

The previously mentioned rivets 48 project through and back of the back disc 44 of the rotating sub-assembly 39 of the control, so that they may engage a switch actuating lever 70 that is pivoted at 71 to the front wall 24 of the main housing. The lever 70 is actuated by an over-center spring. The lever is somewhat angular in shape. It is provided with a pin 72 adjacent its lower end that receives one end of the over-center spring 73. The other end of the over-center spring is attached to a pin 74 that projects forwardly from the front plate 24 of the main housing 15.

The inner end of the lever 70 lies adjacent the inner face of the back disc 44 so that it is in position to be engaged by each of the pins 48 as the control sub-assembly is rotated with rotation of the magazine. In 45° of rotation of the control assembly, one of the pins 48 will move across the inner end of the lever 70. During this motion, it will displace the lever until the over-center spring 73 forces the lever into its position illustrated in solid lines.

The other end of the lever 70 has a foot 76 turned backwardly to operate in an arcuate slot 77 in the front wall 24 of the main housing. The ends of the slot limit the rocking movement of the lever 70. Projecting across the slot 77 in position to be engaged by the lever 76 is the actuator 80 of a micro switch, schematically indicated at 81. This is a one-way actuator. As the lever 70 moves to its upper position, its foot 76 can pass across the actuator without displacing the switch. However, when the lever moves back downwardly to its lower position, it will actuate the switch. A micro switch BZ-2RW825 is typical of switches of this type.

A thrust bar 82 is pivotally connected at 83 to the lever 70 laterally of the pivot 71. This bar is slidably mounted in and held in place by a bracket 84, for up and down movement within the control casing, and at its upper end it is held in position to be engaged by a manual pushbutton 85. The pushbutton is normally urged upwardly by coil spring 86 that acts in its lower position against a ledge 87 mounted on the control box 16. It will be observed that the pushbutton 85 is separate from the thrust bar 82.

The lock 18 has a keeper 90 within the control box. The keeper 90 is oscillatable into and out of engagement with a slot 91 in a striker plate 92 attached to the wall 24.

The machine includes electrical components illustrated diagrammatically in FIGURE 10. There two power lines 93 and 94 provide power to a heater 95. The heater circuit is energized by the switch 81. A magnetic holding coil 96 and a timer 97 are also put across these lines when the switch 81 is closed. The coil 96 closes a holding switch 98 to maintain the heater and timer in circuit after release of the switch 81. After a predetermined time, the arm of the timer 97 opens the switch 99 and deenergizes the coil 96. This returns the entire circuitry to its inactive starting condition.

Operation

To use the machine, seven of the receptacles 27 of the magazine 22 are filled with packages containing the ingredients for coffee, or whatever is to be dispensed. The receptacle opposite the opening 20 is left empty (and if desired, may be omitted). In connection with the preferred use as a coffee dispenser, a small carton C containing the amount of coffee necessary for two cups, along with the granulated sugar and powdered cream therefor, could be provided. Such cartons of ingredients can be inserted into the receptacles of the magazine through the outlet opening 20. Alternately, an appropriate opening in the main housing 15, may be provided as by removal of the top panel of the casing 15.

With the machine loaded, but with no coins inserted, all of the control dogs 50 are in their released positions so that the feet 57 thereof engage with the ring 60. The topmost dog 50 will have its foot 57 engaged against the first of the teeth 61 on the ring 60. In the meanwhile the ratchet dog 66 is engaged against a tooth 42 on the ratchet ring 41. Therefore the entire machine is rigidly held against movement.

When the user inserts a coin, such as a quarter, through the slot 56 and presses it downwardly, it will first engage between the nose 52 on the dog 50 and the pin 48, and when pressed firmly down will, finally, reach the position illustrated wherein it has rocked the dog 50, and it is held by three point contact with the nose 52 and the breast 53 on the dog 50, and the pin 48. The torsion spring 59 urges the dog 50 into position firmly to hold the coin 55.

In this position, the foot 57 of the dog 50 is displaced away from the teeth 61 on the ring 60, so that the entire control sub-assembly, as well as the shaft 23 and the magazine 22, may be rotated in a feeding direction. Having inserted the coin, with one hand, and having grasped the knob 32 with the other hand, the user may rotate the knob 45°, until the successive ratchet dog 50 brings its foot 57 against the first of the teeth 61, whereupon all movement of the control assembly and the magazine, as well as of the handle 32 is prohibited. In this movement, the coin is moved away from the slot 56 to the inside of the control box where it is inaccessible and cannot be removed. Also a receptacle 27 is presented to the discharge opening 20, and the next succeeding ratchet dog 50 is presented below the coin slot 56 to receive another coin. The user may grasp the opposite sides of the carton and draw it out of the machine.

In the foregoing action, in addition to the foregoing, one of the pins 48 engages the lever 70 and displaces it over center to drive its foot 76 to upper position. The foot 76 passes the switch 31 without actuating the same. However, it moves the thrust rod 82 up against the bottom of the push pin 85, thereby conditioning or cocking the mechanism for actuating the heater at the will of the user.

The machine is preferably supplied with a heating grill illustrated at 95 in FIGURE 10, and a water container or coffee pot. The heating grill however, is not directly operated by rotation of the knob 32. After obtaining the ingredients, the user may then obtain the necessary water in the pot, and place the same on the grill 95. Thereupon the user depresses the previously cocked pushbutton 85 which drops the lever 70 back over center to its initial position. In this movement, the switch 80 is actuated and the heater 95 is energized until the timer 97 opens the switch 99. The time is adequate to heat the water or to brew the coffee. A thermostatic control may be used instead of the timer to insure that the water will be brought at least to the proper temperature, or the coffee brewed, and could act in the circuit to open the switch 99 when the water reaches a desired temperature. After the water is adequately heated, the switch 81 will return its actuator to its initial position and the entire mechanism will be in its starting position, ready to receive another coin.

After the magazine has been exhausted, it is necessary to withdraw the coins and reload the machine. Coins may be readily removed by opening the control box and forcing each coin out by inserting a finger into its slot 45 and pushing outwardly. The magazine may be restocked through the discharge opening 20 when the control box is open. The ratchet dogs 66 are held off while the knob 32 is rotated to return each receptacle 27 to position opposite the opening 20.

The machine is illustrated as having seven receptacles for ingredients and seven receptacles for coins. It is entirely practical in a coffee dispensing machine for use in a hotel room to provide such a relatively small number of units. Obviously, however, more can be provided by shortening the angular distance between them, or making the machine larger, or setting some side by side.

The present machine obstructs operation without a coin, because if something is inserted in the coin slot to displace the dog 50, then as the machine is rotated by the handle 32, the dog is withdrawn from the instrumentality being used to displace it, and once again is spring-urged to engage a subsequent tooth 61 and relock the machine against further movement. Any number of such teeth 61 may be used as is demanded by the conditions or likelihood that people will try to misuse the machine.

Coins cannot be removed from the machine, because they are inaccessible as soon as an operation is completed. Even if they were forced from their retainers, they would fall to the bottom of the control box. By having the coins held in place as an element of the operating mechanism, complex holding devices can be omitted.

The magazine is preferably rotatable. However, some of the features of the invention could be used with other dispensing means of which the art knows many types. The movements of the dispensing means are to be coordinated with movements of the control mechanism. The latter may be modified. Other types may be used in some of the inventive combinations. In one inventive combination, there is a machine that displaces articles to a delivery point, after being released by a coin or other starting means, and there is another controlling device rendered operative by the movement coordinated with the dispenser movements. This controlling device may be, as shown, cocked by the movement aforesaid, for subsequent activation at the will of the user.

Specifically, the machine comprises a coin-operated coffee ingredients dispenser, with a heater cocked for operation for a predetermined cycle, when the dispenser is operated.

Other equivalents will be obvious and are embraced within the language of the claims.

What is claimed is:

1. In a food dipsensing machine: a dispenser having a magazine for containing a plurality of units of food, each in a different position in the magazine, the magazine being movable to bring each unit to dispensing position; a heater; coin-responsive means to render the dispenser movable to dispense the food to be prepared; means to render the heater operative, means operated by movement of the magazine to each dispensing position to cock the means to render the heater operative; and means operable independently of movement of the dispenser when the aforesaid means is cocked, for producing energization of the heater.

2. In a coffee dispensing machine: a dispenser having a magazine for storing a plurality of packages of coffee-making ingredients each in a different position in the magazine; a heater; mechanism for operating the dispenser to move packages of ingredients successively to dispensing position; means for cocking the heater for operation; means operated by movement of the magazine to each position for dispensing a package for operating the cocking means to cocked position; means operable at the will of the user for operating the cocked means to position for effecting operation of the heater; and means for limiting the duration of operation of the heater.

3. The combination of claim 2, wherein there is coin controlled means for maintaining the dispenser inoperative, which means is released in response to presence of a coin.

4. A coin-controlled mechanism having a housing; a movable device in the housing; a stop within and fixed to the housing; and releasable means carried by the movable device, the releasable means including one element fixed to the movable device, and a movable latch engageable with the stop to hold the device against movement and displaceable by a coin of given diameter to release the device, the movable latch having two spaced coin-engaging parts, each of which, when the latch is so displaced, is spaced from the fixed element by a distance less than the diameter of the coin, the two parts and the fixed element then pocketing the coin in latch-displacing condition during at least a portion of subsequent movement of the device.

5. The mechanism of claim 4, wherein there are a plurality of such releasable means on the movable device arranged to be brought successively into a predetermined coin-receiving position wherein their respective latches engage the stop to hold the movable device against movement, the pocketing of the coin in latch-displacing condition enabling the device to move until the latch of a following releasable means engages the stop.

6. The mechanism of claim 5, wherein the releasable means latch the movable device against movement in one direction; and there is ratchet means preventing movement in the other.

7. The mechanism of claim 6, wherein there is a switch control on the housing movable to and from a cocked position; means on the movable device to displace the switch control to the cocked position each time the movable device is moved; and a switch actuated by movement of the control from the cocked position.

8. In a machine of the kind described: a housing; article-dispensing means in the housing including a magazine to contain a plurality of articles to be dispensed, the magazine being operable to displace articles successively to dispensable position; a control device operable to two positions and a movable actuator therefor, movable from a released position to a cocked position from which it may be returned to released position to operate the control device; and means moved upon operation of the magazine of the dispensing means from one dispensing position to the next to move the actuator to cocked position; and a separate means for so moving the actuator from its cocked position.

9. In a machine of the kind described: a housing having a discharge opening; a product magazine adapted to store a plurality of products to be dispensed and movable to introduce them successively to the discharge opening for withdrawal from the machine; a control device having a movable actuator, movable to a cocked position from which it may move to operate the control device; and a control mechanism, that has a member movable with and to positions corresponding to positions of the magazine, the control mechanism, including means to prevent movement of the magazine, and means releasable to enable the magazine to be moved; and means operated upon movement of the movable member of the control mechanism, to operate the actuator to cocked position; and separate means for initiating movement of the actuator from its cocked position.

10. A coin-controlled mechanism having a housing; a movable device in the housing; a stop within and fixed to the housing; releasable means carried by the movable device, the releasable means including one element fixed to the movable device, and a movable latch engageable with the stop to hold the device against movement and displaceable by a coin of given diameter to release the device, the movable latch having two spaced coin-engaging parts, each of which, when the latch is so displaced, is spaced from the fixed element by a distance less than the diameter of the coin, the two parts and the fixed element then forming a coin-locating assembly; and spring means pressurably engaging one of the latch parts with said coin, and thereby, during subsequent movement of the movable device, holding said coin in the location established by said assembly.

References Cited in the file of this patent

UNITED STATES PATENTS

| | | |
|---|---|---|
| 505,724 | Poore | Sept. 26, 1893 |
| 708,167 | Pifer | Sept. 2, 1902 |
| 842,783 | Harrison | Jan. 29, 1907 |
| 915,521 | Wilkins | Mar. 16, 1909 |
| 1,382,475 | Collins | June 21, 1921 |
| 1,772,990 | Feher | Aug. 12, 1930 |
| 1,787,644 | Schermack | Jan. 6, 1931 |
| 1,811,345 | Bell | June 23, 1931 |
| 2,073,124 | Stair | Mar. 9, 1937 |
| 2,236,198 | Osborne | Mar. 25, 1941 |
| 2,531,238 | Tandler | Nov. 21, 1950 |
| 2,796,812 | Koci | June 25, 1957 |
| 2,831,419 | Timm | Apr. 22, 1958 |
| 2,834,510 | Cenotti | May 13, 1958 |